United States Patent [19]
Marks

[11] Patent Number: 5,979,105
[45] Date of Patent: Nov. 9, 1999

[54] MODULAR ANIMAL TRAP

[76] Inventor: Max H. Marks, 383 Hwy. 49, McCrory, Ark. 72101

[21] Appl. No.: 09/061,482

[22] Filed: Apr. 16, 1998

Related U.S. Application Data

[63] Continuation-in-part of application No. 08/636,231, Apr. 23, 1996, abandoned.

[51] Int. Cl.$^6$ .......................... A01M 23/08; A01M 23/18
[52] U.S. Cl. .......................... 43/61; 43/66; 43/85; 43/87; 43/69
[58] Field of Search .................................... 43/58, 60, 61, 43/62, 63, 66, 67, 68, 69, 70, 72, 74–75, 77–78, 81–83, 85–86, 88–91, 95–97

[56] References Cited

U.S. PATENT DOCUMENTS

| | | | |
|---|---|---|---|
| D. 286,741 | 11/1986 | Clauss | D8/373 |
| 1,132,428 | 3/1915 | Boswell . | |
| 1,382,425 | 6/1921 | Kass . | |
| 1,581,444 | 4/1926 | Holroyd . | |
| 1,654,434 | 12/1927 | Senecal . | |
| 1,793,773 | 2/1931 | Brown . | |
| 1,844,739 | 2/1932 | Austin . | |
| 1,858,096 | 5/1932 | Lementy . | |
| 2,527,629 | 10/1950 | Free | 43/96 |
| 2,541,681 | 2/1951 | Andrews | 43/61 |
| 2,573,228 | 10/1951 | Slauth | 43/61 |
| 3,174,250 | 3/1965 | Gilbert | 43/61 |
| 3,624,952 | 12/1971 | Gordon | 43/61 |
| 3,778,923 | 12/1973 | Cuoco | 43/69 |
| 3,992,802 | 11/1976 | La Rue | 43/61 |
| 4,310,984 | 1/1982 | Brubaker, Jr. | 43/61 |
| 4,318,241 | 3/1982 | Fassauer | 43/58 |
| 4,583,316 | 4/1986 | Holtgrefe | 43/61 |
| 4,590,703 | 5/1986 | Cutter | 43/61 |
| 4,612,723 | 9/1986 | Reed | 43/61 |
| 4,633,610 | 1/1987 | Thompson | 43/85 |
| 4,763,439 | 8/1988 | Smith | 43/61 |
| 4,979,327 | 12/1990 | Harris | 43/61 |
| 5,067,271 | 11/1991 | Henning | 43/60 |
| 5,345,710 | 9/1994 | Bitz | 43/61 |
| 5,720,125 | 2/1998 | Oviatt | 43/61 |

FOREIGN PATENT DOCUMENTS

| | | | |
|---|---|---|---|
| 8808247 | 11/1988 | Sweden | 43/66 |
| 103158 | 2/1924 | Switzerland | 43/66 |

*Primary Examiner*—Michael J. Carone
*Assistant Examiner*—Son T. Nguyen
*Attorney, Agent, or Firm*—J. Charles Dougherty

[57] ABSTRACT

A modular trapping system that functions in a holding or a terminating mode on dry land, adjacent water or in water. The system comprises several interchangeable, user selectable components that may be conveniently assembled into a desired trap configuration in a minimal time period. The primary components are a cylindrical body with a tapered end, an entrance, and a terminus. In the preferred embodiments, the entrance and terminus may be threadably secured to the body. The entrance components generally comprise a hollow elongated tubular frame supporting a door controlled by a conventional actuating mechanism. The terminus components comprise a hollow elongated tubular frame with a transparent end wall. Several optional inserts may be placed inside the body to enhance the trap. An optional stand may also be used to place the trap adjacent or in bodies of water. The configured trap may be deployed in either a holding or extermination mode. In the holding mode, target animals are held in the interior after entering the trap. In the extermination mode, the target animals are exterminated after entering the trap. When the system is used adjacent a body of water or in the water, the water may be used advantageously. Alternatively, water may be stored internally in the annulus and released appropriately for extermination purposes.

23 Claims, 8 Drawing Sheets

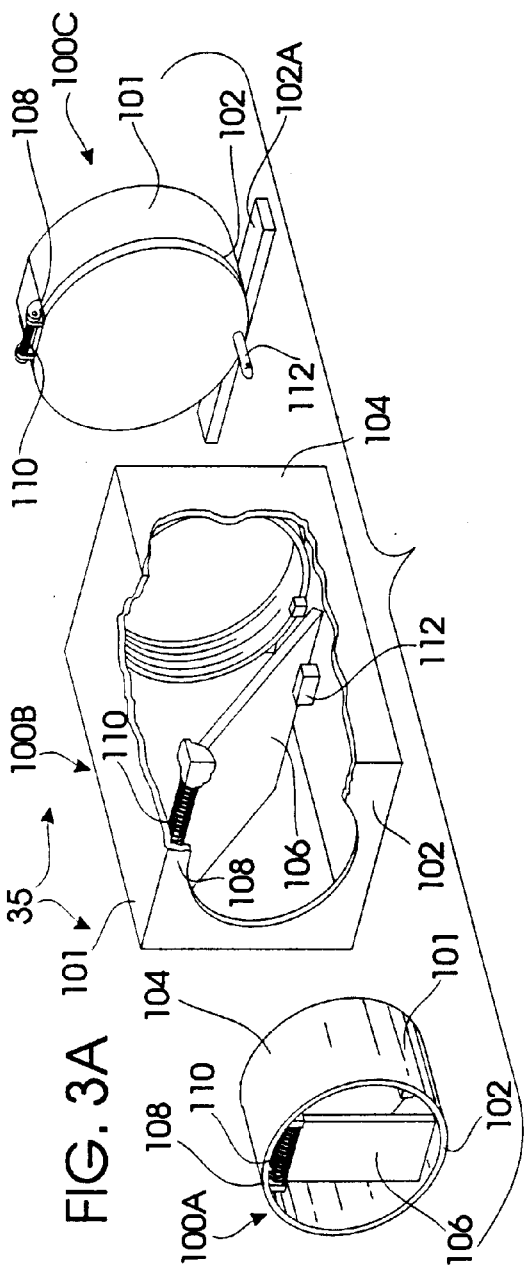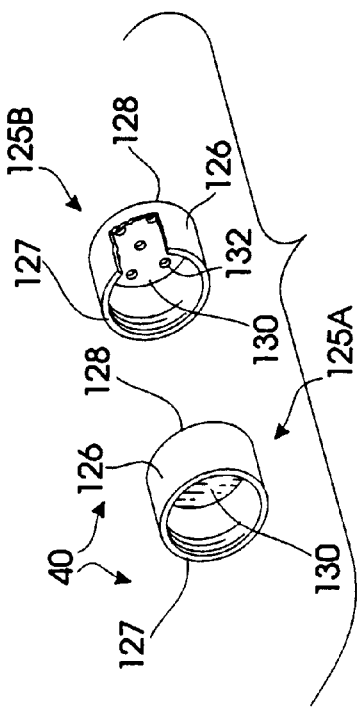

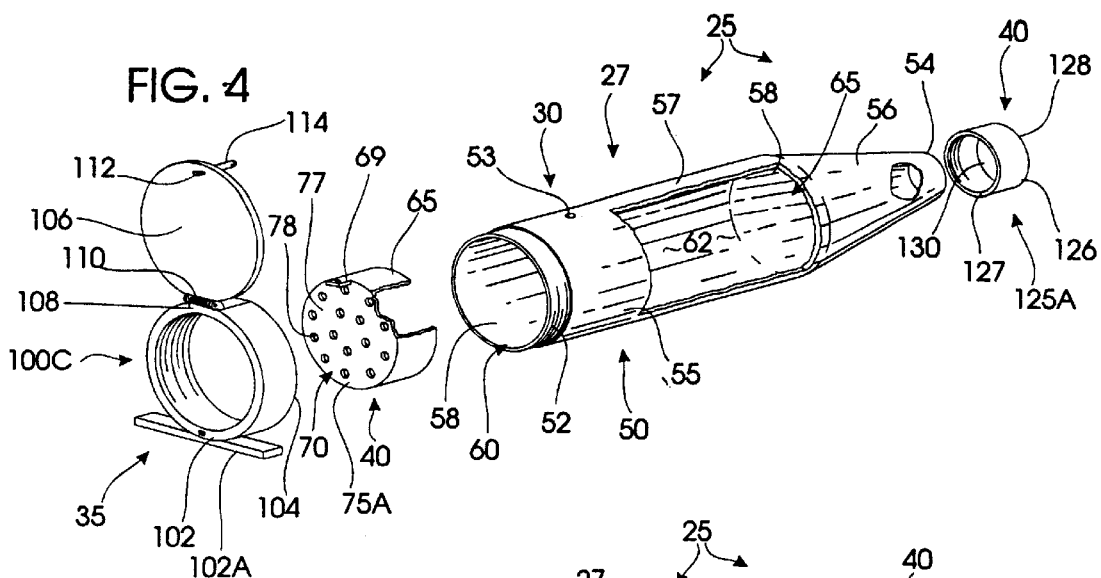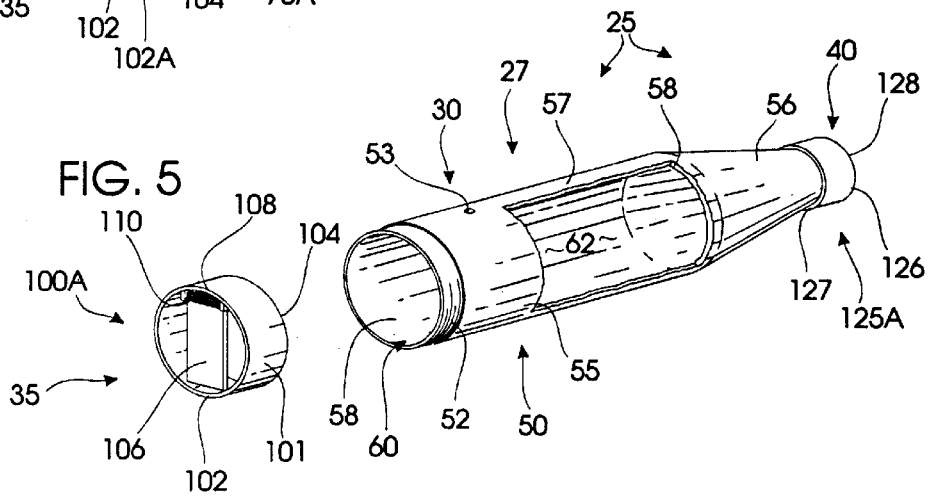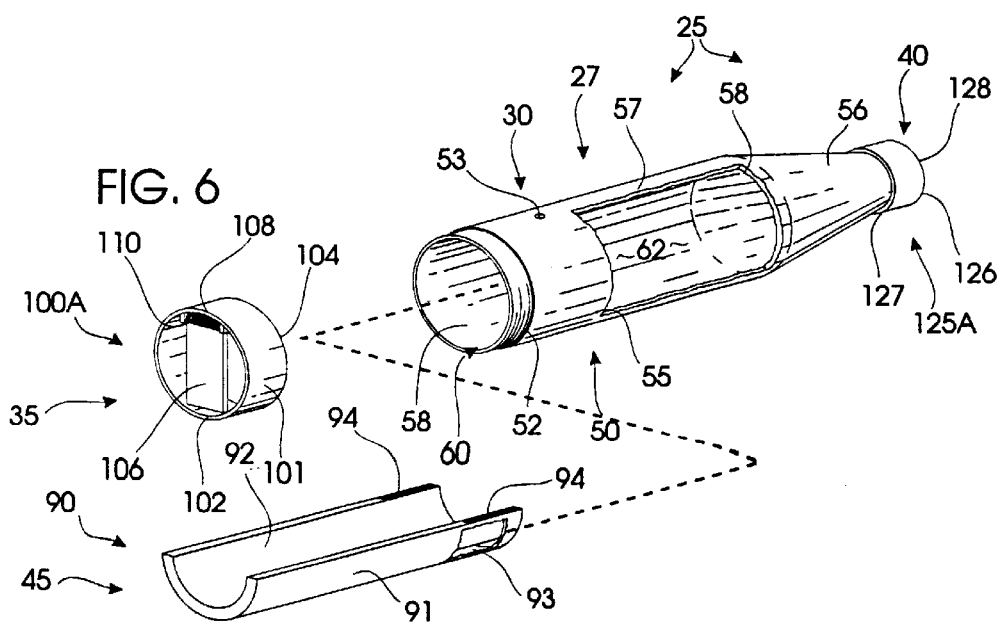

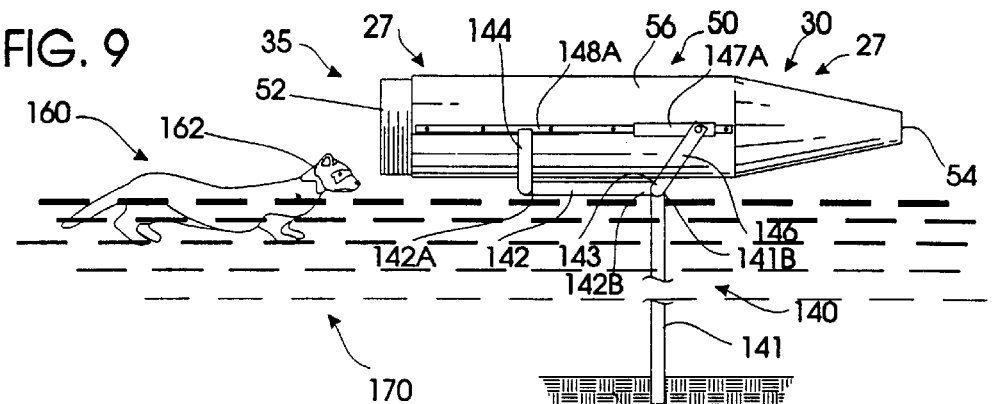
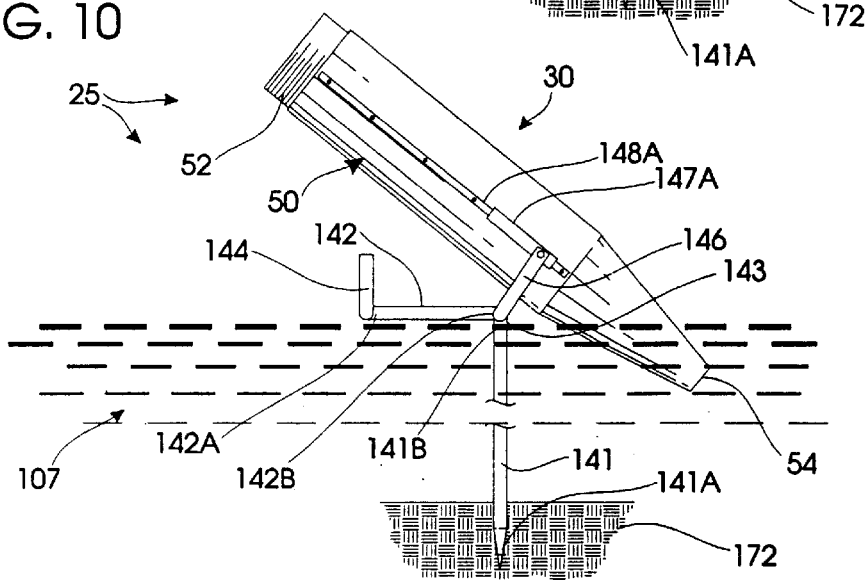
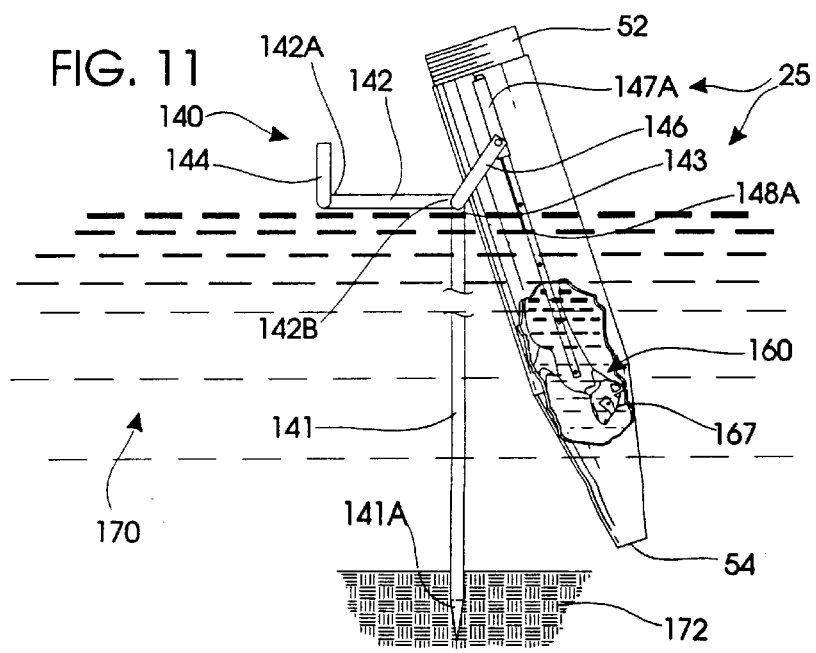

MODULAR ANIMAL TRAP

This application is a continuation-in-part application of U.S. patent application Ser. No. 08/636,231, filed Apr. 12, 1996, now abandoned. The entire disclosure of U.S. patent application Ser. No. 08/636,281 is hereby adopted and incorporated by reference herein.

FIELD OF THE INVENTION

The present invention relates generally to traps. More specifically, the present invention is directed to a trap that may be easily configured by a user to conform to a particular environment. Known relevant prior art may be found in U.S. Class 43, subclasses 58 and 61.

BACKGROUND OF THE INVENTION

Most conventional prior traps can be classified as either "holding" or "terminating" traps. Holding traps generally capture a live animal and detain the animal until released by the trapper. Terminating traps typically exterminate captured animals immediately.

Holding-type traps usually have at least three elements: 1) a body (holding area), 2) a trigger, and 3) a door (generally either gravity or spring-loaded). While terminating traps can be structurally simpler than a holding trap, they are often just holding traps to which an exterminatory method has been added.

Both types of traps often use bodies comprising a metal frame that is covered with heavy wire. Some traps use an enclosed body made of metal or other materials.

Most conventional trigger designs employ pressure-sensitive release mechanisms. When actuated (i.e., stepped on by an animal), the mechanism normally moves a metal rod that releases the door. The door is typically held in the open position and biased in the closed position with the release of the holding rod, the door falls and latches. The door may also be cooperatively or alternatively spring-loaded to close and latch.

Kass, U.S. Pat. No. 1,382,425 shows the use of combination holding and terminating water trap to kill mice, rats or other small vermin.

Smith U.S. Pat. No. 4,763,439, shows a device that use an air-tight cylindrical tube as a holding area. Preferably, a knock-out or an asphyxiating pellet exterminates the animal.

Another cylindrical tube trap is shown in U.S. Pat. No. 4,583,316, issued to Holtgrefe. The Holtgrefe device traps the animal inside a cylindrical tube using a trigger that is roughly in its center.

A variety of vertically moving trap doors of general relevance are shown in U.S. Pat. Nos. 4,310,984, issued to Burbaker, Jr., 2,541,681, issued to Andrews, 5,345,710, issued to Bitz, and 1,654,434, issued to Senecal.

An interesting device is shown in U.S. Pat. No. 1,858,096, to Lementy. Apparently, the trap only captivates the animal's head. Another interesting device is shown in U.S. Pat. No. 4,318,241, issued to Frassauer. Once the mouse enters the trap, the trap rotates and releases an asphyxiating foam material that fills the trap.

Notwithstanding the above prior art, adverse weather conditions prevent most conventional outdoor traps from functioning correctly. For example, no known conventional land trap will continue to function properly after being exposed to snowfall or freezing rain. Thus, an improved trap should be able to continue functioning properly during adverse weather conditions.

Another advantage lacking in most prior land traps is the adaptability to be appropriately reconfigured so that animals may also be trapped adjacent water or in the water. Such a trap could be utilized to catch a live animal or drown a captured animal.

Yet another problem with many prior traps involves the use of bait. Federal statutes prohibit the use of uncovered baits if the bait can be seen by predatory birds (i.e., eagles, hawks, etc.). Thus, an improved trap would permit the selective use of live bait and other types of baits as well as scents.

Furthermore, many prior traps look exactly like what they are—"traps" or "cages". An improved trap would need to be disguised, preferably looking like a portion of the target animals natural environment. For example, many target animals regularly use pipes or culverts as convenient paths. Thus, a trap that looked like another pipe or culvert (i.e., a hole to be explored or a shortcut to be traveled) would be ideal.

An ideal trap must work equally well on the land and in the water. Thus, the trapper may selectively use the trap on dry land, adjacent water or actually deployed in the water, either floating on it or submerged beneath it. Furthermore, such a trap should also permit the trapper to either capture live animals or terminate target animals.

SUMMARY OF THE INVENTION

My user-configurable animal trap overcomes several deficiencies associated with many prior art traps. My trap can be used in adverse weather conditions and it can also be used as either a holding or a terminating trap on dry land, adjacent a water source and either on or in the water.

The trap comprises several, preferably interchangeable, user selected components. Preferably, the components may be conveniently assembled into a desired trap configuration in a minimal time period. The components may also be selected to meet everchanging regulatory guidelines as well as uncertain environmental parameters. Preferably, the system components are molded from plastic or some other similar, lightweight yet strong, durable material. For convenience, the components will be grouped as body components, entrance components and terminus components hereinafter.

The body components generally comprise all of the components that are associated with the primary, central trap frame. The frame comprises an elongated hollow, tubular body tapered at one end. Preferably, the body is generally cylindrical, thus permitting conventional, commercially available PVC pipes to be used advantageously for forming at least a portion of the body. Of course, the tubes should be dimensionally selected based on the desired target animal (i.e., smaller tubes for smaller animals and larger tubes for larger animals). Furthermore, exceptionally large tubes should be appropriately reinforced with exterior rings or other devices when necessary.

Optional trap devices may be inserted into the body interior as needed, including release mechanisms, terminating devices, etc., as discussed in more detail hereinafter. obviously, such optional devices must have slightly smaller diameters than the interior diameter of the body in order to be inserted into the interior.

Preferably the exterior surfaces of the outer sleeve ends are threaded to facilitate coupling with entrance and terminus components. Thus, the outer sleeve ends may be easily coupled to selected entrance and/or terminus components in the field after the user assesses applicable environmental parameters.

The user may couple the entrance body end to any of several different entrance components as necessary. Generally, the selected entrance component is dictated by the exigencies of a particular installation. Preferred entrance components each comprise a threaded door assembly, but it is anticipated that additional, well-known entryway designs could also be assimilated as additional entrance components.

The preferred door assemblies generally all comprise a hollow elongated tubular frame using a gravity-operated, a spring-biased, or a trigger-actuated biasing mechanism with a cooperating inwardly or outwardly opening door attached thereto. Preferably, the door frame is generally cylindrical, thus permitting conventional, commercially available PVC pipes to be used advantageously for forming the door assemblies. As with the body, the tubes should be dimensionally selected based on the desired target animal (i.e., smaller tubes for smaller animals and larger tubes for larger animals).

The door frame is bounded by a spaced apart edge or lip. A swinging door is rotatably mounted upon the exterior frame lip. The door permits ingress into the trap body to target animals. In one embodiment, the door is held open until the target animal "trips" a release mechanism. In another embodiment, the door is lightly closed so that it can be easily pushed open to permit a the target animal to enter the trap body. In such an embodiment, the door latches after the animal pushes past. Preferably the interior frame lip is threaded to facilitate coupling with the outer body sleeve.

When a terminal end closure is required, the user may couple the terminal body end to one of several different terminus components. The selected terminus is based on the target animal characteristics (i.e., need live bait, smelly bait, etc.). The preferred terminus components each comprise a threaded cap, but it is anticipated that other designs could also be adapted to function with the invention.

The preferred cap comprises a hollow elongated tubular frame that may be easily threadably coupled to the terminal body end. Preferably, the frame is generally cylindrical, thus permitting the aforementioned advantageous use of commercially available PVC pipes. As with the body, the size of the terminus cap is based on the desired target animal (i.e., smaller tubes for smaller animals and larger tubes for larger animals). The terminus frame is bounded by two spaced apart edges or lips.

The terminus configuration is primarily based upon the characteristics of the target animal. Thus, if an important consideration is to convince the target animal that the terminus will permit egress from the body, the terminus can either have a Plexiglas wall to give the appearance of an exit or actually have an opening. Such constructions cultivate the animal's thought that it can enter and leave the trap unhindered on the other hand, if baits are needed to entice the target animal into the trap, the terminus should be closed to retain the bait inside the trap. Of course, an appropriate body insert should be cooperatively used to maximize such an effect.

One preferred embodiment of the trap system permits the termination of captured animals. Termination may be accomplished by any one of a number of methods. Conventional spring-loaded striking devices may be placed inside the trap as well as strangulation nooses.

In one particularly desirable embodiment of the system, water is used to drown the captured animal. The system may be either utilized in a free standing configuration either adjacent to or in a body of water. This embodiment may also be used with an internal water storage device or in a floating orientation. Generally, after the animal enters the trap, the body rotates and begins sliding downwardly and forwardly until it plunges the trapped animal's head beneath the water level. Alternatively, the trap may simply orient the animal's head near the end of the trap as the lower half of the trap fills with water. In this manner, trapped animals may be conveniently exterminated. of course, all of the components of the trap are interchangeable and may be used as desired by the user to configure the trap to conform to environmental constraints, applicable government regulations or other operating parameters.

Finally, the trap may be suspended from a long filament, which in a preferred embodiment may simply be fishing line, so that the trap may be lowered into holes, chimneys, and other difficult to reach areas where animals may hide. Animals can then climb into the trap with the entrance end facing downward, preferably with the addition of a ladder inserted into the trap. The ladder may be suspended from a mandible of the snap jaw if this terminating device is used. Alternatively, the trap may be tied to an object with a filament and then placed on the edge of a cliff or other overhang. As an animal enters the trap and moves toward the terminal end, the trap tips over the edge and falls. When the filament is pulled taught, the animal's own weight wedges it into the narrower tapered section of the trap body, thereby trapping the animal without the need of a door. If the overhang extends over water, the filament may be tied so that the trap falls into the water before the filament is pulled tight so that the animal is drowned after entering the trap and tipping it over the edge into the water.

Thus, a principle object of the present invention is to provide a trap configurable for use on land or in the water.

Another related object of the present invention is to provide a trap that terminates captured animals.

Yet another basic object of the present invention is to provide a user-configurable trap that permits the user to conform to applicable governmental regulations.

Another related object of the present invention is to provide a trapping system that permits a user to configure the trap to resemble the natural habitat of the target animal.

Another related object of the present invention is to provide a trap that employs live bait.

Another related object of the present invention is to provide a trap that releases smaller non-target animals while retaining larger target animals.

Still another object of the present invention is to provide a trap that may be utilized in the water, either near the water's surface or submerged beneath it.

A related object of the present invention is to provide a floating trap.

Another basic object of the present invention is to provide a trapping system that utilizes water to drown a captured animal.

A related object of the present invention is to provide a trapping system that internally stores water used to exterminate a trapped animal.

Another basic object of the present invention is to provide a trap that functions properly even under severe winter weather conditions.

Another basic object of the present invention is to provide a trap that can be successfully used by anyone to remove nuisance animals from their own property, thereby eliminating the need to hire professional animal control specialists.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3A is a perspective view showing three optional entrance components inserts that may be selectively employed with the system;

FIG. 3C is showing two optional terminus components that may be selectively employed with the system;

FIG. 4 is a partially fragmented, exploded view showing another configuration for the trapping system, with portions thereof broken away or omitted for clarity;

FIG. 5 is a partially fragmented, exploded view similar to FIG. 4, showing a different configuration for the system, with portions thereof broken away or omitted for clarity;

FIG. 6 is a partially fragmented, exploded view similar to FIGS. 4 and 5, showing another configuration for the system using a water insert for exterminating a target animal, with portions thereof broken away or omitted for clarity;

FIG. 9 is an environmental view showing one embodiment of the trapping system deployed in a body of water;

FIG. 10 is an environmental view similar to FIG. 7, but showing the system in a moved position;

FIG. 11 is an environmental view similar to FIGS. 7 and 8, but showing the system in another moved position;

DETAILED DESCRIPTION

Referring more specifically to the drawings, a preferred embodiment of my trap is generally designated by referenced 25 in FIGS. 1–12. The trap 25 may be deployed in either a holding mode (FIGS. 1–5 and 14) or in an extermination mode (FIGS. 6 and 9–13).

Figure 1:
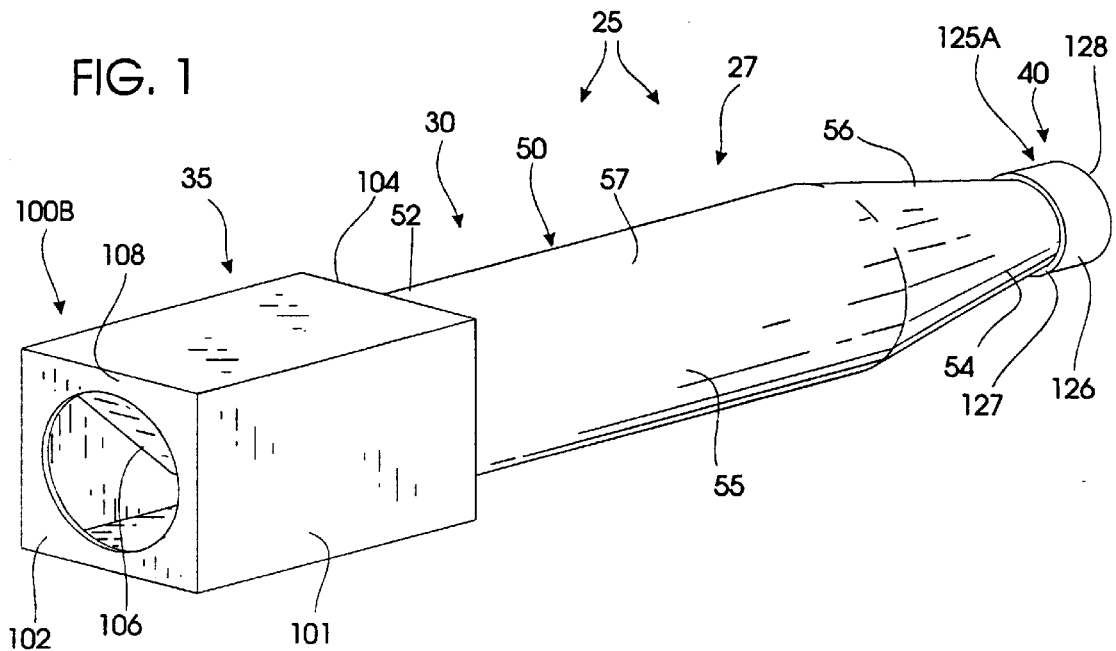
FIG. 1 is a perspective view showing one preferred embodiment of my trapping system.
Figure 2:
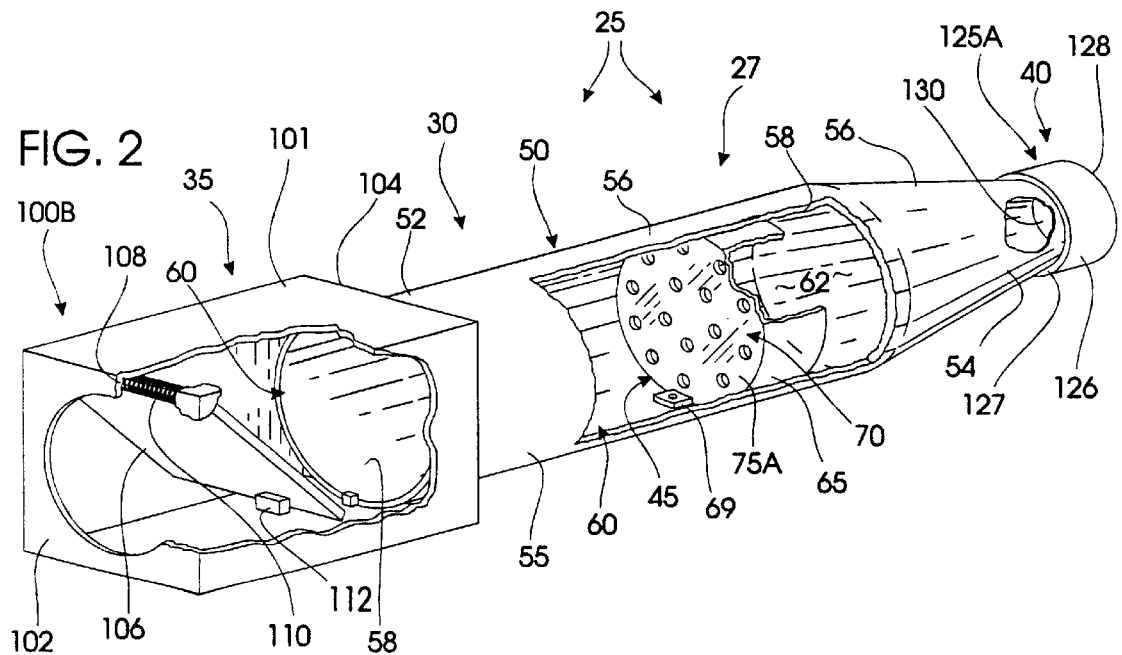
FIG. 2 is a partially fragmented, perspective view of the embodiment shown in FIG. 1, with portions thereof broken away or omitted for clarity.
Figure 3:
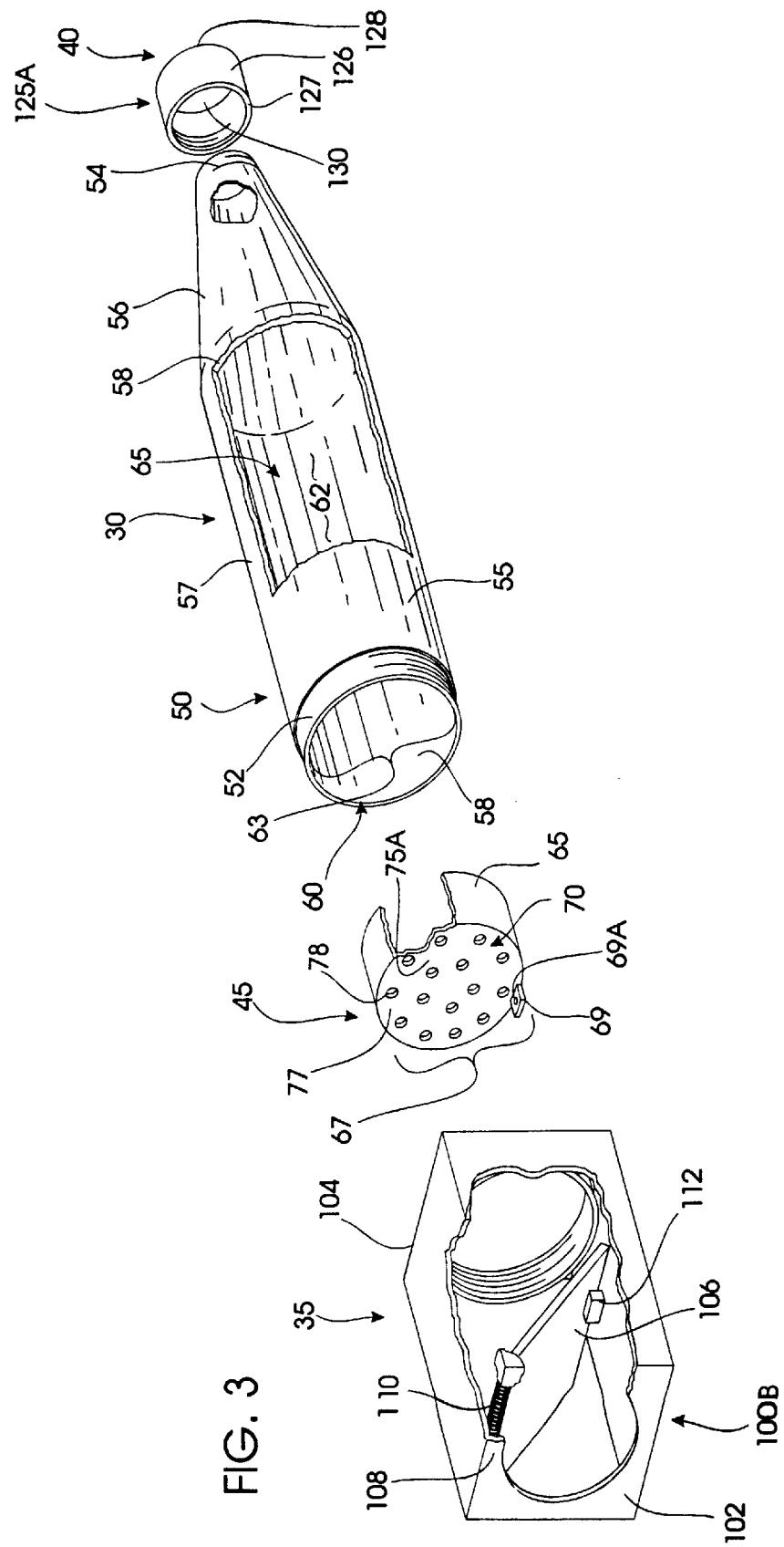
FIG. 3 is a partially fragmented, exploded view similar of the embodiment shown in FIGS. 1 and 2, with portions thereof broken away or omitted for clarity.

Preferably, trap 25 comprises a trap 27 selectively assembled from three primary components (FIGS. 1–3). The three primary components are a body component 30, an entrance component 35, and a terminus component 40. However, an assembled trap 27 may be comprised of any number of primary components (i.e., only the body 30 or the body 30 combined with the entrance 35 or other combinations). The assembled trap 27 may also utilize an optional insert 45 inside the body component 30 to increase its efficiency or enhance trap operation.

In most of the preferred embodiments, interchangeable entrance components 35 and terminus components 40 may be easily combined with the preferred body component 30 and any optional inserts 45 to assemble trap 27 into a desired configuration. In other words, the components may be easily assembled into a desirable trap configuration in the field. Such selectivity permits the user to easily adapt the trapping system to overcome changing environmental conditions while readily conforming to applicable governmental guidelines. Since the entrance components and terminus components are interchangeable and function similarly, identical reference numerals and terms will be used where possible. Furthermore, since the optional inserts are also similar, identical reference numerals and terms will also be used where possible.

The preferred body 30 comprises an elongated hollow frame 50 that houses any selected optional inserts 45 as well as the target animal. Frame 50 comprises two spaced apart ends, an entrance end 52 and a terminal end 54 (FIG. 3). Preferably, both ends 52, 54 are threaded to receive a selected entrance component 35 and a selected terminus component 40. Frame 50 further comprises an elongated, cylindrical tube 55 extending from entrance end 52 to an integral tapered conic 56. Conic 56 extends from tube 55 to terminal end 54. A trigger orifice 53 may be drilled into tube 55. Tapered section 56 provides a stop for inserts 45. Tube 55 comprises an exterior, outer sleeve 57 covering an inner sleeve 58 that defines an interior 60.

Interior 60 receives and retains the target animal during trapping. Preferably, the interior surface 62 is smooth and tractionless. Interior 60 may also selectively receive optional inserts 45. Of course, as previously mentioned, the interior diameter 63 should be appropriately dimensioned depending upon the target animal. In other words, the larger the target animal, the larger the interior diameter needs to be. Conversely, the smaller the target animal, the smaller the interior diameter can be. Thus, it is anticipated that several varying body diameters or sizes will be available to suit the particular requirements for a chosen target animal. After a particular body size is selected, the rest of trap 27 may be assembled. At this point, any optional insert 45 is simply placed inside interior 60 prior to the attachment of the selected entrance component 35 and terminus component 40.

Figure 3B:
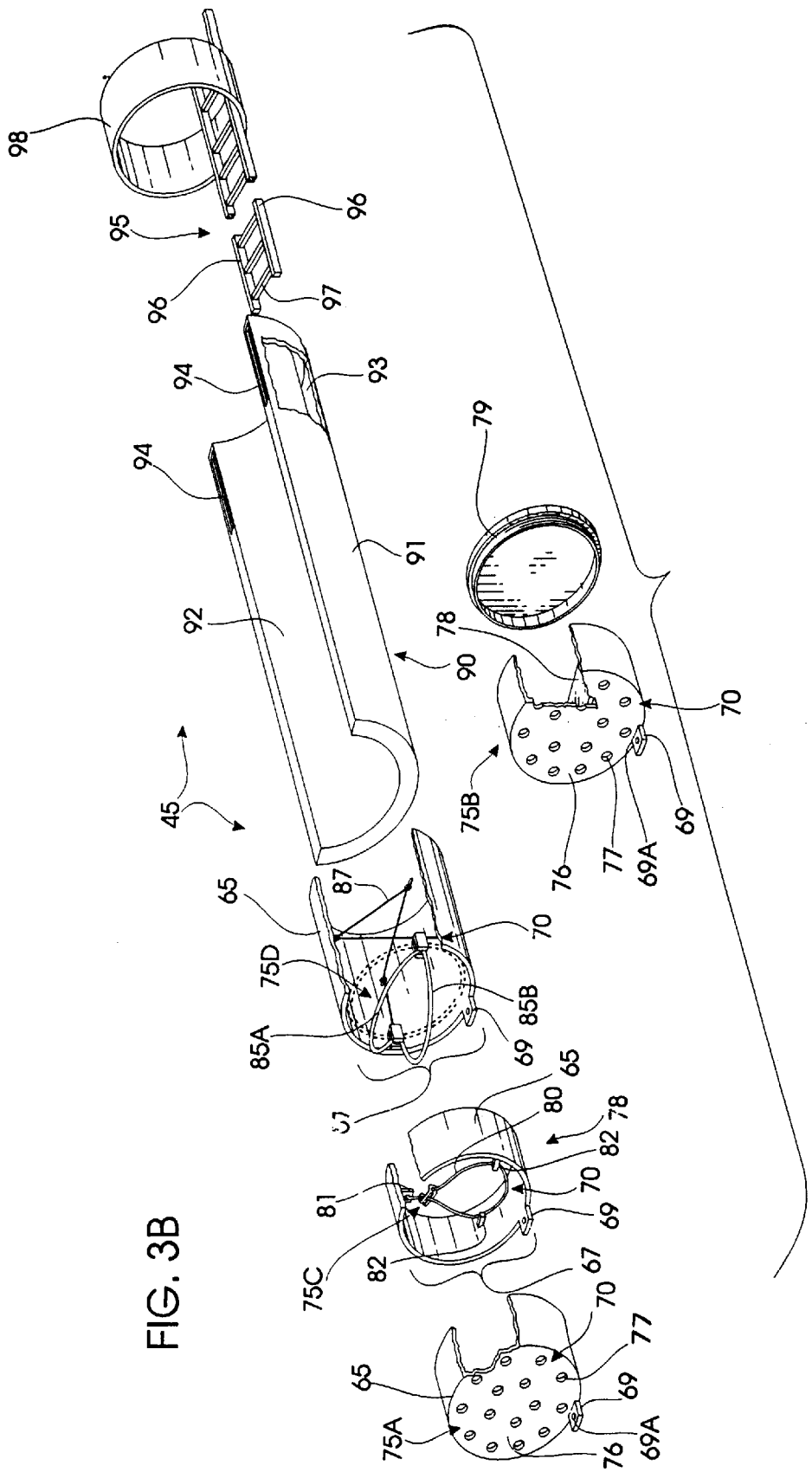
FIG. 3B is a perspective view showing six optional body inserts that may be selectively employed with the system.

Optional inserts 45 can be selectively employed to enhance trap 25 (FIG. 3B). Preferred embodiments for optional insert 45 all generally comprise a sleeve 65 that has a outer diameter 67 that is necessarily smaller than interior diameter 63. Therefore, all of the inserts 45 may be easily placed in tube 55. Several inserts 45 utilize a tab 69 on the edge of sleeve 65 to appropriately trigger the entrance component 35 as necessary. Tab 69 has a string receiving orifice 69A for receiving a string-type trigger from the entrance component 35. Since such conventional string-type triggering arrangements are mechanically simple and wellknown to those in the art, one is not specifically shown in the drawings. Sleeve 65 also supports a specialized attachment 70 for each insert 45.

The contemplated attachments 70 comprise a bait partition 75A, separating bait partition 75B, a snare mechanism 75C and a crushing snap jaw 75D. Other optional inserts include a water storage trough 90 and a climbing ladder 95.

The bait partitions 75A, 75B enable the trapper to use bait, either live bait or other types of bait, with trap 27. Both bait partitions 75A, 75B comprise a protective cap face 76, penetrated by several air passageways 77. The air passageways 77 permit the bait's scent or sounds to be smelled or heard throughout the trap interior 60. Ideally, the target animal either hears or smells the bait and enters the trap through entrance component 35. However, even after the target animal enters the interior 60, it cannot reach the bait behind either partition 75A, 75B. Separating bait partition 75B also uses a shelf 78 to separate different types of bait. An optional threaded rear face 79 may also be used with either bait partition 75A or 75B if desired.

The snare mechanism, 75C, and crushing snap jaw 75D, exterminate the trapped animal. Snare mechanism 75C comprises a loop 80 extending from a tie-down 81. In use, the loop snares the target animal's head as it enters the trap to trigger the entrance component 35 while strangling the animal. A pair of spaced apart retainers 82 can be used to properly size loop 80.

Crushing snap jaw 75D comprises an upper and lower mandible 85A and 85B. Mandibles 85A, 85B are biased toward each other by a conventional spring or any other conventional biasing mechanism known to the art (not shown). During use, mandibles 85A, 85B are independently set and held (the set position is shown in dashed lines) by an appropriate, monofilament trigger line 87. As with conventional jaw traps, when the target animal trips the trigger, mandibles 85A, 85B (85B is shown in the closed position) spring together forcefully to crush the head or another vital organ of the trapped animal. Mandible 85B may also be left in the closed position shown in FIG. 3B to facilitate the use of ladder insert 95 as is more fully discussed hereinafter.

The water storage trough 90 also exterminates the trapped animal by drowning it. Trough 90 is designed to be used when trap 27 is placed in a rotating configuration similar to that shown in FIGS. 9–11. In other words, when the trap 27 is installed so that it rotates from a substantially horizontal configuration to a substantially vertical position, trough 90 may be used for exterminatory purposes. Trap 27 may be installed to rotate by using external rotary accessories that are discussed in more detail hereinafter. Alternatively, trap 27 may be installed adjacent a hole in the ground to accomplish a similar rotary movement (not shown). Trough 90 comprises an outer sleeve 91 and a spaced apart inner sleeve 92. Outer sleeve 91 and inner sleeve 92 cooperatively define an annulus 93 therebetween. Annulus 93 may be used to store fluids, such as water, in trough 90. A pair of openings or slots 94 establish fluid flow communication from the annulus 93. During use, annulus 93 is filled with a fluid, such as water. Then trough 90 is placed inside trap interior 60 (FIG. 6) As long as trap 27 maintains a substantially horizontal orientation, the fluids remain inside annulus 93. However, as soon as the orientation of trap 27 begins to rotate downwardly toward end 54, the stored fluids in annulus 93 flow into trap interior 60.

Figure 14:
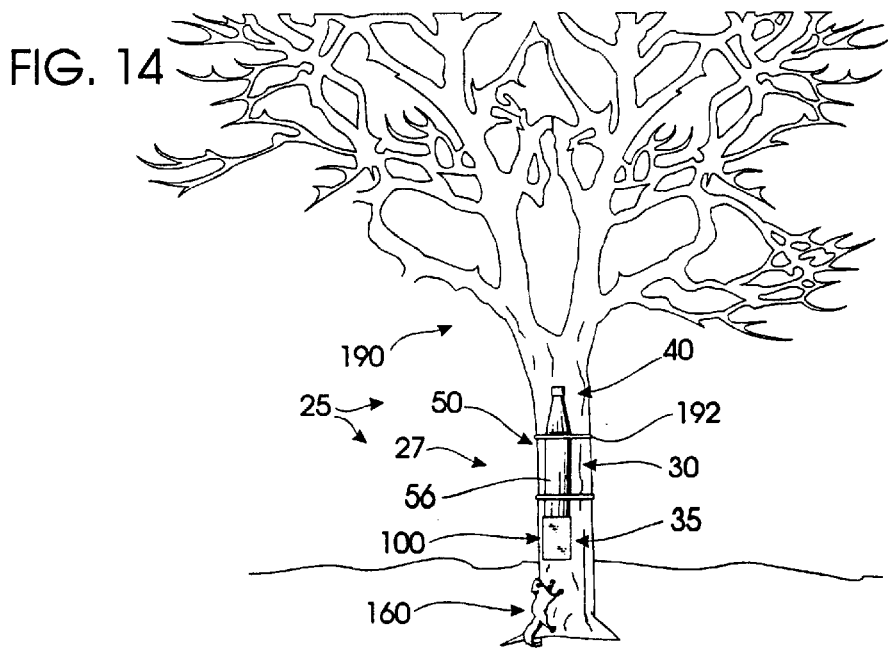

Climbing ladder 95 permits the trap 27 to be oriented vertically while still permitting target animal ingress (FIG. 14). Generally, ladder 95 is used cooperatively with another insert to maximize the effectiveness of trap 27. Ladder 95 comprises a pair of spaced apart, elongated poles 96 (FIG. 3B). Poles 96 are interconnected by regularly spaced rungs 97. Rungs 97 permit the target animal to climb ladder 95 and subsequently enter vertically oriented trap 27. Since ladder 95 is primarily used when trap 27 is oriented vertically, sleeve 98 permits the ladder to hold up component 35 to maintain a proper positioning and alignment in trap 27.

Of course, additional optional inserts could be adapted for use with trapping system 25 to further enhance the capabilities of the system. As previously stated, the optional inserts are preferably installed during trap configuration to enhance the capabilities of the trap 27. The user simply selects an appropriate insert 45 and pushes it into interior 60 as desired.

Once the trapper has configured the body 30 and any chosen inserts 45 therein, the trap may be further assembled by choosing an entrance component 35. The selected entrance component 35 is simply threadably coupled to the entrance end 52 of the body component 30.

The preferred entrance components 35 each generally comprises an elongated doorway assembly 100A, 100B or 100C (FIG. 3A). Assembly 100A comprises a tubular core 101 that extends from an exterior end 102 to an interior end 104 adjacent body component 30. The interior end 104 is preferably threaded to mount entrance end 52. The exterior end 102 generally mounts a door 106. Generally the door mounts to the lip 108 on end 102. Door 106 is biased by spring 110 in a closed position. Thus, door 106 must be pushed open by the target animal to gain ingress into trap 27. Then the door simply swings shut behind the target animal, and latches and locks.

Assembly 100B also comprises a tubular core 101 with ends 102 and 104. Assembly 100B adds an internal catch 112 that locks door 106 after the target animal enters trap 27. Assembly 100C adds a release mechanism 114 that is associated with the door to maintain it in a properly displaced configuration until triggered by a target animal (as previously discussed). A catch 112 secures the door 106 in a closed position after actuation. Spring 110 may be located either on the inside of the doorway assembly 100A, 100B, or 100C, on the outside (as shown in FIG. 3A). Moreover, other conventional biasing devices may be easily adapted to replace spring 110. A stabilizer 102A may also be added to assemble 100A if necessary, to prevent the trap 27 from rolling. All three preferred embodiments of door assemblies are shown in an assembled trap 27 in FIGS. 1–6. After an appropriate entrance component 35 is selected, the user need only select a terminus component 40 to finish assembling the trap 27.

The selected terminus component 40 is threadably coupled to the tapered terminal end 54 of the body component 30. Preferred terminus embodiments are shown in FIGS. 1–6. Generally the preferred terminus component 40 comprises a short cap 125A or 125B. Caps 125A, 125B each comprise a tubular body 126. Body 126 extends between two spaced apart ends 127, 128. Preferably, interior end 127 is threadably coupled to body component 30 similarly to doorway assembly 100A–C. Cap 125A uses a solid rear wall 130 that fits end 128. Preferably, wall 130 is made from a clear Plexiglas material to give the appearance of an opening to the exterior. Cap 125B includes several air portals 132 that penetrate wall 130.

Once the trap 27 is assembled, it should be placed appropriately in the target animal's environment. Contemplated deployments for trap 27 include simply laying the trap 27 on the ground, digging a small trench for the trap 27, or other well-known trap installation methods. An alternative stand for supporting trap 27 in the water (FIGS. 9–11) or on an adjacent ditch bank (FIG. 12) or similarly elevated structure is shown in FIGS. 7–8A.

Figure 7:
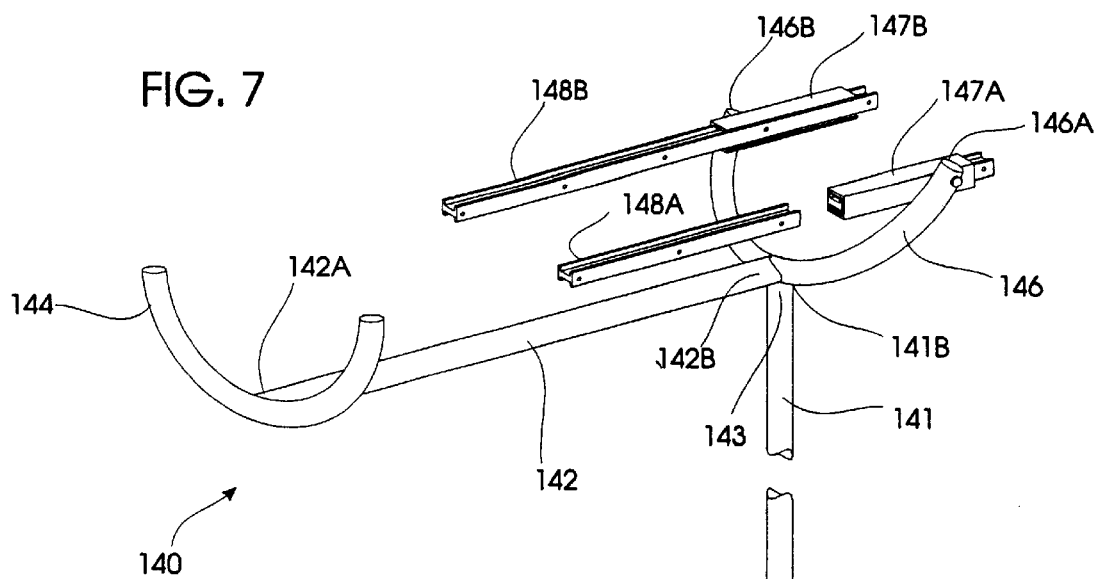
FIG. 7 is a perspective view showing a first optional stand that may be selectively used with the trap system.
Figure 8:
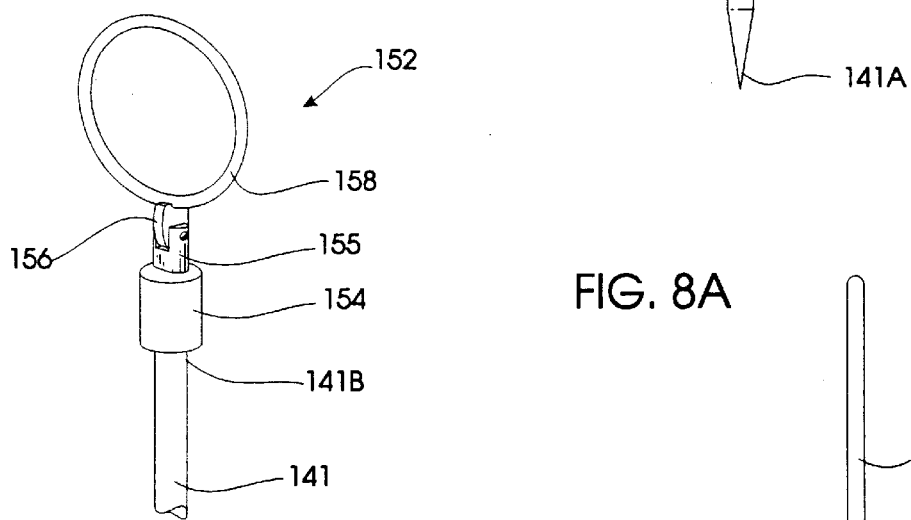
FIG. 8 is a perspective view showing a second optional stand that may be selectively used with the trap system.
Figure 8A:
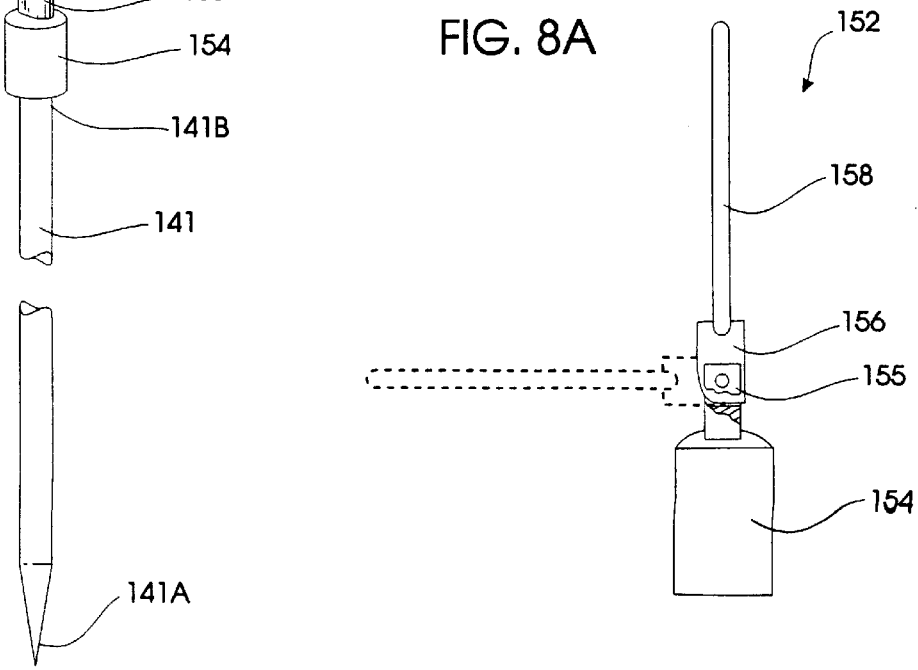
FIG. 8A is an enlarged side elevational view of the stand shown in FIG. 8, with dashed lines showing a moved position.

An optional stand is shown in FIGS. 7–8A. The stand 140 can be used to selectively elevate trap 27. Stand 140 comprises a elongated post 141. Preferably post 141 has a sharpened end 141A that facilitates insertion into the ground. Post 141 terminates in a support top 141B.

In one embodiment, a horizontal support arm 142 extends outwardly from the a juncture 143 at post top 141B. Preferably, a cradle 144 extends upwardly from the arm's distal end 142A. A U-shaped yoke 146 also mounts post top 141B at juncture 143, adjacent arm end 142B. Yoke 146 facilitates pivotal movement by trap 27 upon animal entry. A pair of sliding guides 147A, 147B pivotally mount each terminal yoke end 146A, 146B. Each guide 147A, 147B slidably receives a railing 148A, 148B. Each railing 148A, 148B normally stays between entrance component 35 and terminus component 40 when trap 27 is properly installed. Thus, when an animal enters the trap 27 and passes juncture 143, trap 27 rotates at guides 147A, 147B about the axis established therebetween. Guides 147A, 147B then begin sliding along railings 148A, 148B, moving vertically relative to post 141. If the stand 140 is employed, the body component 30 rests upon cradle 144 and yoke 146 while railings 148A, 148B are suitably secured to the body frame 50.

In a second embodiment, a collar 152 mounts post 141 on top 141B. Collar 152 comprises a base 154 that directly mounts top 141B. A slot 155 receives tab 156 on ring 158. In use, trap 27 simply slides through ring 158 until reaching a desired equilibrium point. Trap 27 is then suitably temporarily secured in ring 158. Tab 156 prevents ring 158 from rotating until the target animal passes the established equilibrium point. Of course, the elevated stand could be appropriately configured to hold a trapped animal instead of simply terminating it. All the trapper would need to do is lock the trap in the elevated position by wedging a simple stop into the pivoting mechanism of the previous two embodiments.

As discussed above, the user may choose from among any of the, entrance components 35 and terminus components to couple with the body component 30 to assembly trap 27. Furthermore, any of the inserts 45 may be used within the body interior 60. While trap 27 is deployed in a holding mode, the target animal simply enters the trap and is retained in interior 60. However, when trap 27 is deployed in the exterminating mode, the target animal is exterminated after entering the trap.

Figure 12:
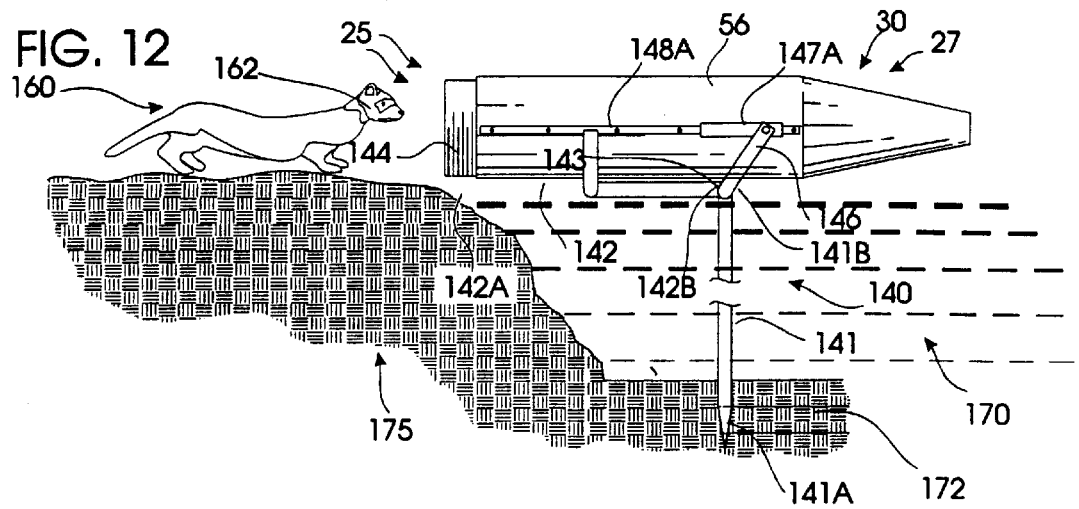
FIG. 12 is an environmental view similar to FIG. 7, but showing the trapping system deployed adjacent a body of water.

One particularly preferred embodiment for exterminating the target animal is shown in FIGS. 9–12. The trap 27 may be used in a variety of configurations to effectively exterminate a target animal 160. For example, the trap 27 is assembled without an entrance component 35 or a terminus component 40. Trap 27 is then mounted in a pool of water 170 on optional stand 140 stuck in bed 172 (FIGS. 9–11). The trap may also be deployed on a ditch bank 175 adjacent to a pool of water 170 (FIG. 12).

As can be seen in FIGS. 9–11, after the target animal 160 enters trap 27 and moves past the equilibrium juncture 143, trap 27 rotates about the pivot point established by guides 147A, 147B. As the trap 27 rotates, it begins sliding along railings 148A, 148B. As can be seen most clearly in FIG. 11, the target animal's head 162 is trapped beneath the surface of pool 170, eventually drowning it.

Figure 13:
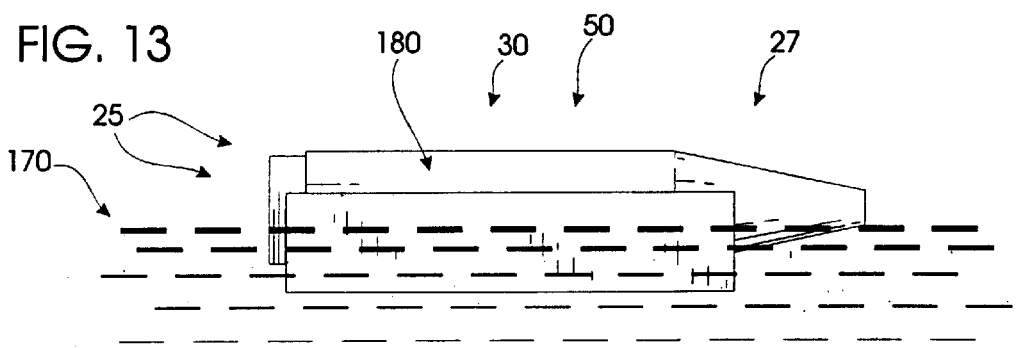
FIG. 13 is an environmental view showing the system installed on a floatation device upon a body of water; and, FIG. 14 is an environmental view showing the embodiment shown in FIG. 1 installed on the side of a tree.

In yet another example, a floatation device 180 may also be used in conjunction with trap 27 (FIG. 13). Floatation device 180 permits the trap to be substantially free-floating in a water 170. When a target animal 160 enters trap 27, the entire trap/float combination either sinks or, if an appropriately designed float is attached, it pivots to plunge at least a portion of the trap 27 beneath the surface of water 170 to drown the target animal 160. The entire body 30 of trap 25 does not necessarily have to plunge beneath the water 170 to effectively drown the animal. It is often enough to submerge only the terminal end 54 and a small portion of the body component 30 to submerge the animal's head 162. In one embodiment, floatation device 180 may be hollow and have water inlets at or near the water line (not shown) when free floating. Entry of target animal 160 will cause the floatation device 180 to move or sink relative to the water line and will cause water to flow through the water inlets, thereby filling floatation device 180 with water and causing the trap 27 to sink.

Trap 27 can also be mounted adjacent to a tree 190 on stand 140 (not shown) or actually on tree 190 using ladder insert 95 (FIG. 14). Of course, to mount upon a tree 190, the trap may be appropriately secured by mounting straps 192 at a desired height or otherwise suitably mounted to the tree. An alternative mounting strategy is to use a filament, such as monofilament fishing line, to suspend the trap from a tree or other object. This filament (not shown) would replace mounting straps 192 and would suspend trap 27 so that entrance end 52 is pointed downward. The filament could be attached to trap 27 by a lug or other conventional means. This mounting approach is especially useful when the trap must be lowered into areas that are difficult to reach, such as holes and chimneys. An optional insert 70 (i.e., snare 75B or jaw 75D &77) would necessarily need to be included in trap 27 to exterminate the target animal 160 when the trap is used in this vertical manner without a closing door.

Another preferred embodiment is to use the trap 27 without optional insert 70 or door assemblies 100A, 100B, and 100C but attach a filament (not shown) so that trap 27 can be suspended with terminal end 54 pointing downward. The filament can then be attached to an object and the trap placed on an edge, such as a cliff, overhang, or deep hole. When target animal 160 enters trap 27, the trap will tip over the edge and begin falling. When the filament pulls tight the trap will be abruptly stopped, thereby wedging target animal 160 into the narrower portion of trap 27 near terminal end 54. Target animal 160 will in effect be trapped by its own weight into the narrower portion of trap 27. Trap 27 can then be retrieved by pulling the trap up using the filament. If water is below the edge along which trap 27 is placed, the filament may be tied such that its length allows trap 27 to strike the water after falling, thereby drowning target animal 160.

From the foregoing, it will be seen that this invention is one well-adapted to obtain all the ends and objects herein set forth, together with other advantages which are inherent to the structure.

It will be understood that certain subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An animal trap comprising:
   (a) an elongated, tubular body, said body having an entrance end and a terminal end and openings at each of said entrance end and said terminal end that are threaded to receive attachments, and said body having a generally circular cross-section and being tapered toward said terminal end;
   (b) a door;
   (c) a hinge connecting said door to said body and allowing said door to open inwardly toward said body;
   (d) biasing means in communication with said hinge, said biasing means holding said door closed but allowing said door to be pushed open by an animal entering said body; and
   (e) a stop adjacent said door preventing said door from opening outwardly away from said body, such that an animal within said body may not exit said body through said door.

2. The animal trap of claim 1, further comprising a door mounting assembly to which said door is connected by said hinge and which is threadably coupled to said body, wherein said door may open at any angle with respect to said body.

3. The animal trap of claim 2, wherein said biasing means comprises a spring.

4. The animal trap of claim 3, further comprising a terminus assembly threadably coupled to said terminal end of said body.

5. The animal trap of claim 4, wherein said terminus assembly comprises a clear plate through which an animal within said body may see outside of said body.

6. The animal trap of claim 4, wherein said terminus assembly comprises a perforated plate.

7. The animal trap of claim 3, further comprising a terminating sleeve assembly slidably and removably fittable within said body.

8. The animal trap of claim 7, wherein said terminating sleeve assembly comprises:
   (a) a sleeve;
   (b) upper and lower mandibles pivotally connected to said sleeve;
   (c) biasing means to compel said mandibles to close toward one another;
   (d) at least one catch releasably holding said mandibles open; and
   (e) a trigger assembly in communication with said at least one catch to release said mandibles when said trigger assembly is activated by an animal within said body, and thereby allowing said biasing means to close said mandibles and terminate the animal within said body.

9. The animal trap of claim 8, wherein said trap further comprises:
   (a) vertical suspension means; and
   (b) a ladder removably attached to one of said mandibles.

10. The animal trap of claim 9, wherein said vertical suspension means is at least one mounting strap.

11. The animal trap of claim 9, wherein said vertical suspension means is a filament connecting said body to a surface above said body, and wherein said filament is attached to said body such that said body is suspended vertically with said entrance end downward.

12. The animal trap of claim 7, wherein said terminating sleeve assembly comprises:
   (a) a sleeve;
   (b) upper and lower mandibles pivotally connected to said sleeve;
   (c) biasing means to compel said mandibles to close toward one another;
   (d) a catch releasably holding one of said mandibles open;
   (e) a trigger assembly in communication with said catch to release that one of said mandibles held by said catch when said trigger assembly is activated by an animal within said body, and thereby allowing said biasing means to close that one of said mandibles held by said catch and terminate the animal within said body.

13. The animal trap of claim 2, futher comprising a semi-annular flotation sleeve partially circumscribing said body.

14. The animal trap of claim 13, wherein said floatation sleeve provides sufficient floatation to hold said body partially submerged when said body is placed in water, thereby allowing an animal to easily swim into said body through said entrance end from the water.

15. The animal trap of claim 14, wherein said floatation sleeve further comprises water inlets such that movement of an animal within said body while said body is floating will cause said sleeve to fill with water thereby causing the trap to sink.

16. The animal trap of claim 2, further comprising a trough slidably fittable within said body, said trough comprising an inner and outer sleeve, said trough adapted to retain a liquid when said body is in a horizontal position and to fill said body with the liquid when said body pivots to a vertical position, and said trough comprising floatation means.

17. The animal trap of claim 2, wherein said trap further comprises:
   (a) vertical suspension means connecting said body to a vertical surface; and
   (b) a ladder attached within said body.

18. The animal trap of claim 2, further comprising a bait partition slidably fittable within said body, said bait partition comprising:
   (a) a round sleeve coaxially, slidably fittable within said body; and
   (b) a holed tab attached to said round sleeve to receive a triggering means.

19. The animal trap of claim 18, wherein said bait partition comprises a protective cap face with air passageways therethrough.

20. An animal trap comprising:
   (a) an elongated, tubular body, said body having an entrance end and a terminal end, and said body being tapered toward said terminal end;
   (b) a stand adapted to hold said body above a surface such that said body is held in a substantially horizontal plane until an animal enters said body;
   (c) a ring adapted to receive said body;
   (d) a base connected to said ring; and
   (e) a pin pivotally connecting said ring to said base.

21. The animal trap of claim 20, further comprising a swinging door assembly, said swinging door assembly comprising:
   (a) a round door;
   (b) a latch to lock said door to said body when said door is closed; and
   (c) a hinge connecting said door to said body, said hinge adapted to allow said door to hang underneath said body, and said hinge adapted to allow said door to hang open when said trap is disposed horizontally on said stand but allow said door to swing closed and latch as a result of said body tipping vertically.

22. The animal trap of claim 20, wherein said stand comprises:
(a) an elongated post;
(b) a horizontal support arm extending from said elongated post and adapted to support said body; and
(c) sliding means connecting said horizontal support arm to said pivoting means, said sliding means adapted to allow said body to slide downward as said body tips vertically and thereby wedge an animal in said body into a narrower section of said body near said terminal end.

23. The animal trap of claim 20, further comprising:
(a) a trough slidably fittable within said body, said trough comprising inner and outer sleeves, said trough adapted to retain a liquid when said body is in a horizontal position and to fill said body with the liquid when said body pivots to a vertical position; and
(b) a terminus assembly threadably coupled to said terminal end of said body, said terminus assembly sealing said terminal end.

* * * * *